United States Patent
Kray et al.

(10) Patent No.: US 10,436,061 B2
(45) Date of Patent: Oct. 8, 2019

(54) TAPERED COMPOSITE BACKSHEET FOR USE IN A TURBINE ENGINE CONTAINMENT ASSEMBLY

(71) Applicant: General Electric Company, Schenectady, NY (US)

(72) Inventors: Nicholas Joseph Kray, Mason, OH (US); Thomas Chadwick Waldman, Boston, MA (US); Manoj Kumar Jain, Karnataka (IN); Mojibur Rahman, Mason, OH (US); Nitesh Jain, Karnataka (IN); Nagamohan Govinahalli Prabhakar, Karnataka (IN); Scott Roger Finn, Montgomery, OH (US); Apostolos Pavlos Karafillis, Winchester, WA (US)

(73) Assignee: General Electric Company, Schenectady, NY (US)

( * ) Notice: Subject to any disclaimer, the term of this patent is extended or adjusted under 35 U.S.C. 154(b) by 486 days.

(21) Appl. No.: 15/486,789

(22) Filed: Apr. 13, 2017

(65) Prior Publication Data

US 2018/0298780 A1 Oct. 18, 2018

(51) Int. Cl.
*F01D 25/24* (2006.01)
*F01D 21/04* (2006.01)
*F04D 29/52* (2006.01)

(52) U.S. Cl.
CPC .......... *F01D 21/045* (2013.01); *F01D 25/24* (2013.01); *F04D 29/526* (2013.01); *F05D 2220/32* (2013.01); *F05D 2220/36* (2013.01); *F05D 2240/14* (2013.01); *F05D 2250/292* (2013.01); *F05D 2300/603* (2013.01)

(58) Field of Classification Search
CPC ...... F01D 21/045; F01D 25/24; F04D 29/526; F05D 2220/32; F05D 2220/36; F05D 2230/603; F05D 2240/14; F05D 2250/292
USPC ............................................................ 415/9
See application file for complete search history.

(56) References Cited

U.S. PATENT DOCUMENTS

| | | |
|---|---|---|
| 4,205,927 A | 6/1980 | Simmons |
| 4,484,856 A | 11/1984 | Patacca |
| 5,259,724 A | 11/1993 | Liston |
| 5,273,393 A | 12/1993 | Jones |
| 5,823,739 A | 10/1998 | Van Duyn |
| 5,885,056 A | 3/1999 | Goodwin |
| 5,899,660 A | 5/1999 | Dodd |
| 6,206,631 B1 | 3/2001 | Schilling |
| 6,371,721 B1 | 4/2002 | Sathianathan |
| 6,382,905 B1 | 5/2002 | Czachor |
| 6,619,913 B2 | 9/2003 | Czachor |
| 6,715,297 B1 | 4/2004 | Swinford |
| 6,857,669 B2 | 2/2005 | Porte |
| 8,371,803 B2 | 2/2013 | Evans |

(Continued)

*Primary Examiner* — Hai H Huynh
(74) *Attorney, Agent, or Firm* — Dority & Manning, P.A.

(57) ABSTRACT

A backsheet for use in a turbine engine fan case includes a first portion including a first portion first end and an opposing first portion second end. The first portion is tapered between the first portion first end and the first portion second end. The backsheet also includes a second portion coupled to the first portion. The second portion includes a second portion first end and an opposing second portion second end. The second portion defines a constant thickness between the second portion first end and the second portion second end.

24 Claims, 3 Drawing Sheets

(56) References Cited

U.S. PATENT DOCUMENTS

| | | |
|---|---|---|
| 8,393,648 B2 | 3/2013 | Marengo |
| 8,757,958 B2 | 6/2014 | Lussier |
| 8,966,754 B2 | 3/2015 | Xie |
| 8,986,797 B2 | 3/2015 | Xie |
| 9,206,706 B2 | 12/2015 | Evans |
| 2008/0199301 A1 | 8/2008 | Cardarella, Jr. |
| 2015/0275695 A1 | 10/2015 | Evans |
| 2016/0097299 A1 | 4/2016 | Evans |
| 2018/0298915 A1* | 10/2018 | Kray .................... F04D 29/526 |

* cited by examiner

TAPERED COMPOSITE BACKSHEET FOR USE IN A TURBINE ENGINE CONTAINMENT ASSEMBLY

BACKGROUND

The present disclosure relates generally to turbine engines and, more specifically, to a rotor section containment assembly having an improved load path transition between components of the assembly.

At least some known gas turbine engines, such as aircraft engines, include a stator assembly that extends circumferentially about a rotor assembly of the turbine engine. Known rotor assemblies include at least one row of rotor blades that extend radially outward from a blade root, for example, such that the rotor blades rotate proximate the stator assembly of the turbine engine. At least some known stator assemblies include a soft wall containment assembly that facilitates providing rotor containment during unlikely events, such as an unexpected blade-out condition. The soft wall containment assembly generally includes an engine casing, a collapsible containment member coupled to the engine casing, and a carbon fiber backsheet extending across the collapsible containment member and a portion of the engine casing.

At least some known backsheet structures are typically a constant thickness. This thickness is the minimum thickness necessary to satisfy strength requirements at each point along the full length of the backsheet. However, some points along the length of the backsheet have lower strength requirements than others, and as such do not require the same backsheet thickness as points with higher strength requirements. Accordingly, at least some known backsheets are overdesigned, which increases the weight of the backsheet and also manufacturing costs.

BRIEF DESCRIPTION

In one aspect, a backsheet for use in a turbine engine fan case is provided. The backsheet includes a first portion including a first portion first end and an opposing first portion second end. The first portion is tapered between the first portion first end and the first portion second end. The backsheet also includes a second portion coupled to the first portion. The second portion includes a second portion first end and an opposing second portion second end. The second portion defines a constant thickness between the second portion first end and the second portion second end.

In one aspect of the disclosure, which may include at least a portion of the subject matter of any of the preceding and/or following examples and aspects, the backsheet includes a third portion coupled to the second portion and including a third portion first end and an opposing third portion second end. The third portion is tapered between the third portion first end and the third portion second end.

In one aspect of the disclosure, which may include at least a portion of the subject matter of any of the preceding and/or following examples and aspects, the second portion is coupled between the first portion and the third portion.

In one aspect of the disclosure, which may include at least a portion of the subject matter of any of the preceding and/or following examples and aspects, the first portion second end, the third portion first end, and the second portion define substantially similar thicknesses.

In one aspect of the disclosure, which may include at least a portion of the subject matter of any of the preceding and/or following examples and aspects, the first portion first end and the third portion second end define substantially similar thicknesses.

In one aspect of the disclosure, which may include at least a portion of the subject matter of any of the preceding and/or following examples and aspects, the first portion first end defines a first thickness and the first portion second end defines a second thickness larger than the first thickness, and the first portion second end is coupled to the second portion.

In one aspect of the disclosure, which may include at least a portion of the subject matter of any of the preceding and/or following examples and aspects, the first portion and the second portion are manufactured from a plurality of plies of a composite material.

In another aspect, a containment assembly for use in a turbine engine is provided. The containment assembly includes an engine case including a shell and an angel wing member extending obliquely from the shell. The assembly further includes a honeycomb structure coupled to the shell, and a backsheet coupled to the honeycomb structure and to the angel wing member. The backsheet includes a first portion including a first portion first end and an opposing first portion second end, wherein the first portion is tapered between the first portion first end and the first portion second end. The backsheet also includes a second portion coupled to the first portion. The second portion includes a second portion first end and an opposing second portion second end, wherein the second portion defines a constant thickness between the second portion first end and the second portion second end.

In one aspect of the disclosure, which may include at least a portion of the subject matter of any of the preceding and/or following examples and aspects, the first portion extends across the angel wing member and the second portion extends across the angel wing member and the honeycomb structure.

In one aspect of the disclosure, which may include at least a portion of the subject matter of any of the preceding and/or following examples and aspects, a gap is defined between a distal end of the angel wing member and the honeycomb structure, and the second portion spans the gap.

In one aspect of the disclosure, which may include at least a portion of the subject matter of any of the preceding and/or following examples and aspects, the second portion includes an angled joint proximate the gap.

In one aspect of the disclosure, which may include at least a portion of the subject matter of any of the preceding and/or following examples and aspects, the containment assembly includes a third portion coupled to the second portion and extending across the honeycomb structure.

In one aspect of the disclosure, which may include at least a portion of the subject matter of any of the preceding and/or following examples and aspects, the third portion includes a third portion first end and an opposing third portion second end. The third portion is tapered between the third portion first end and the third portion second end.

In one aspect of the disclosure, which may include at least a portion of the subject matter of any of the preceding and/or following examples and aspects, the containment assembly includes a layer of containment material extending over the backsheet.

In yet another aspect, a method of forming backsheet for use in a turbine engine containment assembly is provided. The method includes forming a first portion of the backsheet including a first portion first end and an opposing first portion second end such that the first portion is tapered between the first portion first end and the first portion second end. The method also includes integrally forming a second portion with the first portion. Integrally forming the second portion includes forming a second portion first end and an opposing second portion second end such that the second portion includes a constant thickness between the second portion first end and the second portion second end.

In one aspect of the disclosure, which may include at least a portion of the subject matter of any of the preceding and/or following examples and aspects, the method includes integrally forming a third portion with the second portion. Integrally forming the third portion includes forming a third portion first end and an opposing third portion second end such that the third portion is tapered between the third portion first end and the third portion second end.

In one aspect of the disclosure, which may include at least a portion of the subject matter of any of the preceding and/or following examples and aspects, integrally forming the third portion includes integrally forming the third portion first end, the first portion second end, and the second portion to define substantially similar thicknesses.

In one aspect of the disclosure, which may include at least a portion of the subject matter of any of the preceding and/or following examples and aspects, forming the first portion and integrally forming the second portion the third portion first end forming the first portion and integrally forming the second portion from a plurality of plies of a composite material.

In one aspect of the disclosure, which may include at least a portion of the subject matter of any of the preceding and/or following examples and aspects, forming the first portion the third portion first end forming the first portion second end with a thickness defined within a range between about 0.10 inches and about 0.25 inches.

In one aspect of the disclosure, which may include at least a portion of the subject matter of any of the preceding and/or following examples and aspects, forming the first portion the third portion first end forming the first portion first end with a thickness defined within a range between about 0.04 inches and about 0.15 inches.

In yet another aspect, a backsheet for use in a turbine engine fan case is provided. The backsheet includes a first end, an opposing second end, and a body portion extending between the first end and the second end. The body portion includes a non-uniform thickness profile.

In one aspect of the disclosure, which may include at least a portion of the subject matter of any of the preceding and/or following examples and aspects, the body portion defines an annular structure.

In one aspect of the disclosure, which may include at least a portion of the subject matter of any of the preceding and/or following examples and aspects, the body portion includes a first end portion proximate the first end, a second end portion proximate the second end, and a central portion positioned between the first end portion and the second end portion. At least one of the first end portion and the second end portion includes a non-uniform thickness profile.

In one aspect of the disclosure, which may include at least a portion of the subject matter of any of the preceding and/or following examples and aspects, each of the first end portion and the second end portion include a non-uniform thickness profile, and the central portion includes a uniform thickness profile.

DRAWINGS

These and other features, aspects, and advantages of the present disclosure will become better understood when the following detailed description is read with reference to the accompanying drawings in which like characters represent like parts throughout the drawings, wherein.

Figure 1:
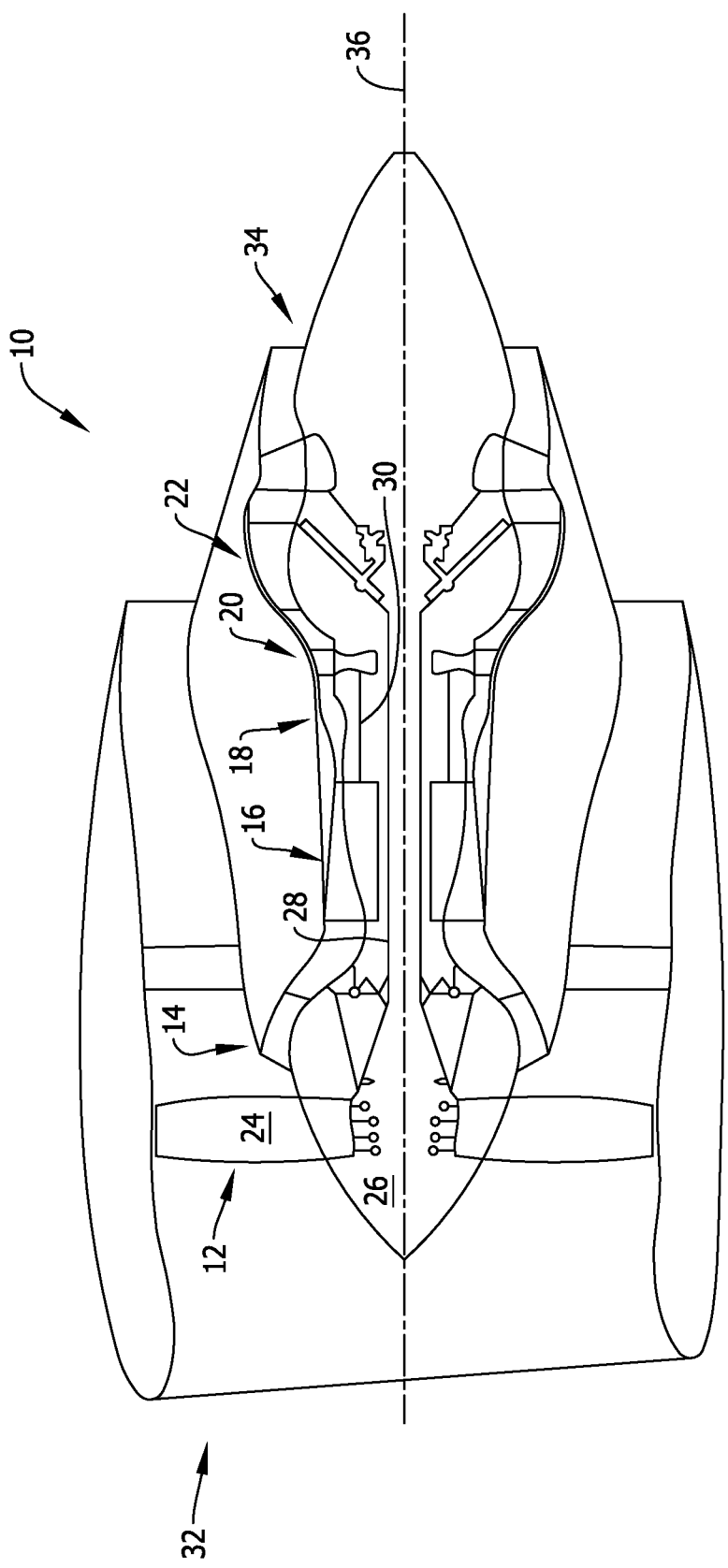
FIG. 1 is a schematic illustration of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to a rotor section containment assembly having an improved load path transition between components of the assembly. More specifically, the containment assembly described herein includes an engine case, such as a fan case, including a shell and an angel wing member extending from the shell. The containment assembly also includes a honeycomb structure coupled to the shell, and a backsheet coupled to the honeycomb structure and to the angel wing member. The backsheet member described herein includes one or more design features that facilitate limiting damage to the backsheet induced by the angel wing member in the event the angel wing member is forced radially outward towards the backsheet, such as during an unexpected blade-out condition. More specifically, the backsheet includes tapered first portion and third portions, and a second portion extending therebetween having a constant thickness. During a blade-out condition, a high concentration load path into the backsheet is located at the angel wing member. As such, the second portion of the backsheet has the greatest thickness so as to provide the necessary strength and stiffness for the backsheet to withstand a blade-out condition. Accordingly, the thickness of the backsheet is tailored along its length based on expected load concentrations and portions of the backsheet are tapered to transition from a smaller thickness to a greater thickness; i.e. a thinner portion to a thicker portion. Such a configuration facilitates reducing the overall weight and manufacturing costs of the backsheet.

While the following embodiments are described in the context of a turbofan engine, it should be understood that the systems and methods described herein are also applicable to turboprop engines, turboshaft engines, turbojet engines, and ground-based turbine engines, for example.

FIG. 1 is a schematic diagram of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbine assemblies 20 and 22 rotate.

During operation, air entering turbine engine 10 through an intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
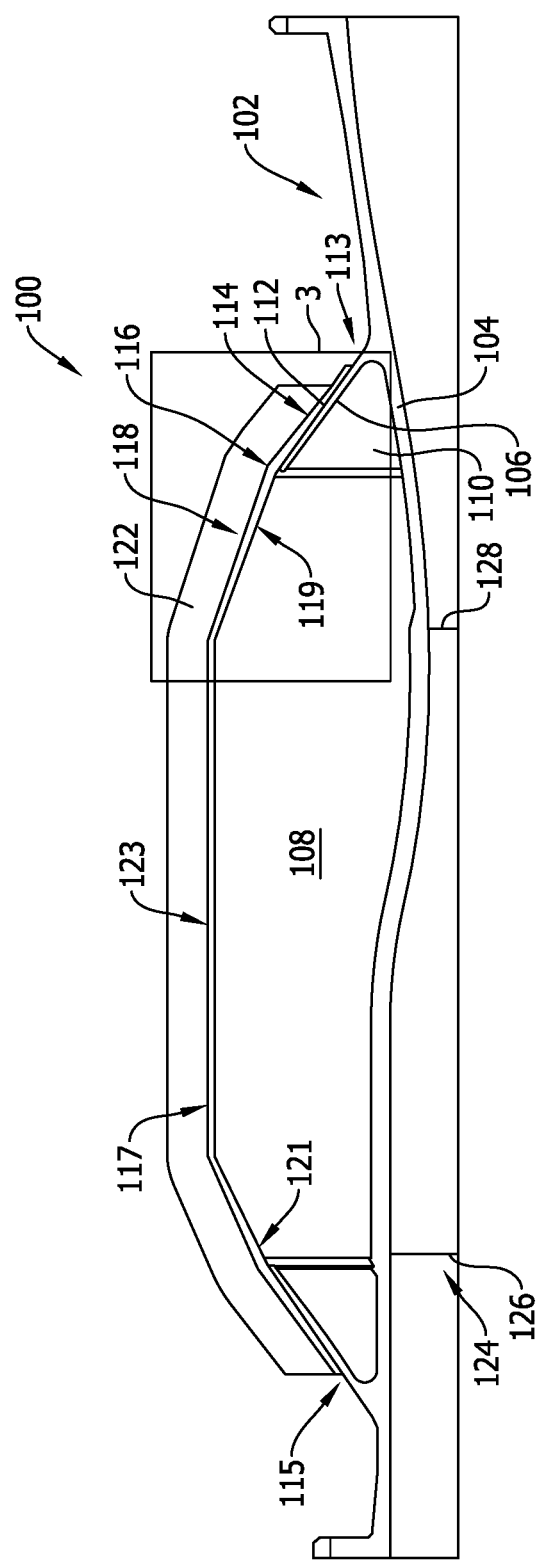
FIG. 2 is a cross-sectional illustration of an exemplary containment assembly that may be used in the turbine engine shown in FIG. 1.

FIG. 2 is a cross-sectional illustration of an exemplary containment assembly 100 that may be used in turbine engine 10 (shown in FIG. 1). In the exemplary embodiment, containment assembly 100 includes an engine case 102 (hereinafter also referred to as a "fan case") including a shell 104 and an angel wing member 106, and a honeycomb structure 108 coupled to shell 104. More specifically, angel wing member 106 is oriented obliquely relative to shell 104 such that a cavity 110 is at least partially defined between shell 104 and angel wing member 106. Honeycomb structure 108 is positioned within cavity 110 to provide noise attenuation when turbine engine 10 is in operation.

Containment assembly 100 also includes an annular backsheet 112 extending over angel wing member 106 and honeycomb structure 108. More specifically, backsheet 112 includes a first end 113, a second end 115, and a body portion 117 extending between ends 113 and 115. In the exemplary embodiment, body portion 117 has a non-uniform thickness profile. More specifically, body portion 117 has a first end portion 119 proximate first end 113, an opposing second end portion 121 proximate second end 115, and a central portion 123 extending between end portions 119 and 121. As shown in FIG. 2, at least one of end portions 119 and 121 includes a non-uniform thickness profile. More specifically, first end portion 119 and second end portion 121 each have a non-uniform thickness profile, and central portion 123 has a uniform thickness profile.

Each end portion 119 and 121 includes a first portion 114 extending across angel wing member 106, a second portion 116 extending partially across angel wing member 106 and partially across honeycomb structure 108, and a third portion 118 extending across honeycomb structure 108. Second portion 116 is defined between first portion 114 and third portion 118. In addition, backsheet 112 is coupled to angel wing member 106 with a layer 120 (shown in FIG. 3) of adhesive material.

Angel wing member 106 and backsheet 112 are each fabricated from any material that enables containment assembly 100 to function as described herein. For example, angel wing member 106 is fabricated from a metallic material, such as aluminum, and backsheet 112 is fabricated from a composite material, such as a carbon fiber reinforced polymer (CFRP) material. As such, and as will be explained in more detail below, a thickness of angel wing member 106 is tailored to facilitate reducing a metallic material-to-composite material ratio at an interface defined between angel wing member 106 and backsheet 112 and thus facilitates providing a smooth load path transition therebetween.

Moreover, backsheet 112 provides a surface in which one or more subsequent layers of material may be positioned circumferentially about engine case 102. For example, in the exemplary embodiment, containment assembly 100 also includes a layer 122 of containment material extending over backsheet 112. The containment material may be any material that enables containment assembly 100 to function as described herein such as, but not limited to, an aramid material (i.e., Kevlar®).

In the exemplary embodiment, an array of rotor blades 124, such as fan blades 24 (shown in FIG. 1), are radially inward from engine case 102. The array of rotor blades 124 and layer 122 of containment material are axially aligned relative to centerline 36 (shown in FIG. 1) of turbine engine 10. More specifically, layer 122 of containment material traverses a leading edge 126 and a trailing edge 128 of rotor blades 124. As such, in the event of an unexpected blade-out condition, layer 122 of containment material is positioned to impede radially outward movement of rotor blades 124.

Figure 3:
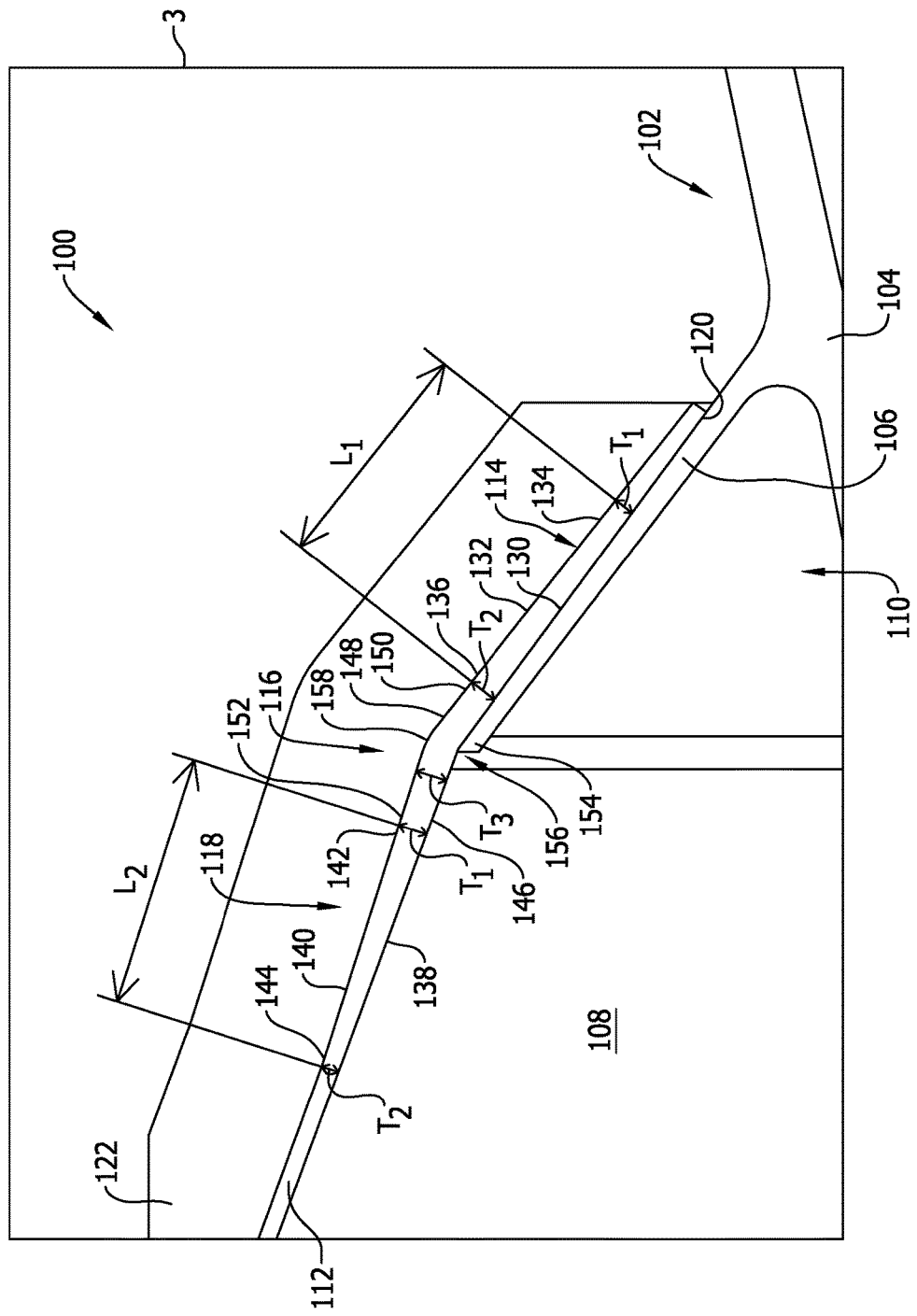
FIG. 3 is a cross-sectional illustration of a portion of the containment assembly shown in FIG. 2 taken along Area 3, in accordance with a first embodiment of the disclosure.

FIG. 3 is a cross-sectional illustration of a portion of containment assembly 100 (shown in FIG. 2) taken along Area 3, in accordance with the exemplary embodiment of the disclosure. As shown in FIG. 3, backsheet 112 includes first portion 114, second portion 116, and third portion 118 coupled in serial arrangement with other such that second portion is between first portion 114 and third portion 118. First portion 114 includes an inner surface 130 and an outer surface 132 that define a thickness of first portion 114 therebetween. Further, first portion 114 includes a first end 134 positioned proximate to shell 104 and an opposing second end 136 positioned proximate to second portion 116. First end 134 and second end 136 define a first length $L_1$ therebetween. In one embodiment, first length $L_1$ is within a range of about 1.0 inches to about 2.0 inches. More specifically, first length $L_1$ is approximately 1.44 inches. Generally, first length $L_1$ is any length that facilitates operation of backsheet 112 as described herein.

As shown in FIG. 3, first end 134 has a first thickness $T_1$ defined between surfaces 130 and 132, and second end 136 has a second thickness $T_2$ defined between surfaces 130 and 132. In the exemplary embodiment, first thickness $T_1$ is smaller than second thickness $T_2$ such that first portion 114 is tapered, and as such, has a non-uniform thickness profile, between first and second ends 134 and 136. More specifically, first end 134 has first thickness $T_1$ defined within a range of about 0.04 inches to about 0.15 inches. Furthermore, second end 136 has second thickness $T_2$ defined within a range of about 0.10 inches to about 0.25 inches. More specifically, first thickness $T_1$ is approximately 0.08 inches, and second thickness $T_2$ is approximately 0.152 inches. Generally, first thickness $T_1$ and second thickness $T_2$ are any length that facilitates operation of backsheet 112 as described herein.

In the exemplary embodiment, third portion 118 includes an inner surface 138 and an outer surface 140 that define a thickness of third portion 118 therebetween. Further, third portion 118 includes a first end 142 positioned proximate second portion 116 and an opposing second end 144. First end 134 and second end 136 define a second length L2 therebetween. In one embodiment, second length $L_2$ is within a range of about 1.0 inches to 2.0 inches. More specifically, second length $L_2$ is approximately 1.44 inches. Generally, second length $L_2$ is any length that facilitates operation of backsheet 112 as described herein.

As shown in FIG. 3, first end 142 has a first thickness $T_1$ defined between surfaces 138 and 140, and second end 144 has a second thickness $T_2$ defined between surfaces 138 and 140. In the exemplary embodiment, first thickness $T_1$ is thicker than second thickness $T_2$ such that third portion 118 is tapered, that is, has a non-uniform thickness profile, between first and second ends 142 and 144. More specifically, first end 142 has a first thickness $T_1$ defined within a range of about 0.10 inches and about 0.25 inches. Furthermore, second end 144 has second thickness $T_2$ defined within a range of about 0.04 inches and about 0.15 inches. More specifically, first thickness $T_1$ is approximately 0.152 inches and second thickness $T_2$ is approximately 0.08 inches. Generally, first thickness $T_1$ and second thickness $T_2$ are any length that facilitates operation of backsheet 112 as described herein. In the exemplary embodiment, first end 134 of first portion 114 and second end 144 of third portion 118 have substantially similar thicknesses. More specifically, first thickness $T_1$ of first portion 114 is substantially similar to second thickness $T_2$ of third portion 118.

Second portion 116 is coupled between first portion 114 and third portion 118 and includes an inner surface 146 and an outer surface 148 that define a thickness of second portion 116 therebetween. Further, second portion 116 includes a first end 150 that is integrally formed with second end 136 of first portion and an opposing second end 152 that is integrally formed with first end 142 of second portion 116. In the exemplary embodiment, second portion 116 has a constant thickness $T_3$ defined between surfaces 138 and 140 and extending between first and second ends 150 and 152. More specifically, second portion 116 has third thickness $T_3$ defined within a range of about 0.10 inches to about 0.25 inches. In the exemplary embodiment, second end 136 of first portion 114, first end 142 of third portion 118, and the entire length of second portion 116 have substantially similar thicknesses. More specifically, third thickness $T_3$ of second portion 116 is substantially similar to second thickness $T_2$ of first portion 114 and to first thickness $T_1$ of third portion 118.

In another embodiment, second portion 116 has a non-uniform thickness profile, wherein second portion 116 has a minimum thickness to satisfy predetermined strength requirements. More specifically, when second portion 116 has a non-uniform thickness profile, a minimum thickness of second portion is substantially similar to the maximum second thickness $T_2$ of first portion 114 and first thickness $T_1$ of third portion 118.

As described above, backsheet 112 is fabricated from a composite material, such as a carbon fiber reinforced polymer (CFRP) material. More specifically, each of first portion 114, second portion 116, and third portion 118 of backsheet 112 are formed from a plurality of plies of composite material. In the exemplary embodiment, areas of greater thickness in backsheet 112 include more layers of composite plies than areas having a smaller thickness. For example, second portion 116, second end 136 of first portion 114, and first end 142 of third portion 118 include more plies of the composite material that first end 134 of first portion 114 and second end 144 of third portion 118 to make up the difference in thicknesses.

In the exemplary embodiment, angel wing member 106 includes a distal end 154 that is spaced from honeycomb structure 108 to form a gap 156 between honeycomb structure 108 and distal end 154. As shown in FIG. 3, second portion 116 spans gap 156 such that a portion of second portion 116 is positioned radially outward from gap 156. More specifically, second portion 116 includes an angled joint 158 positioned proximate to, and radially outward from, gap 156. During a blade-out condition, a high concentration load path into backsheet 112 is located at distal end 154 of angel wing member 106. As such, second portion 116 of backsheet 112 has the greatest thickness of backsheet 112 to provide necessary strength and stiffness for backsheet 112 to withstand a blade-out condition. Furthermore, first and second portions 114 and 118 of backsheet 112 are not subjected to the high loads as second portion 116. As such, first and second portions 114 and 118 can be thinner than second portion 116. Accordingly, the thickness of backsheet 112 is tailored along its length based on expected load concentrations and portions of backsheet 112 are tapered to transition from a smaller thickness to a greater thickness. Such a configuration reduces the overall weight and manufacturing costs of backsheet 112.

An exemplary technical effect of the assembly and methods described herein includes at least one of: (a) providing containment of a rotor assembly; (b) providing a smooth load path transition between metallic and composite components in a containment assembly; and (c) reducing the likelihood of damage to a backsheet in the containment assembly in the event an angel wing member is forced radially outward towards the backsheet.

Exemplary embodiments of a containment assembly for use with a turbine engine and related components are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with a fan section of a turbine engine. Rather, the exemplary embodiment can be implemented and utilized in connection with many applications where providing smooth load transition between components in an assembly is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A backsheet for use in a turbine engine fan case, said backsheet comprising:
    a first portion including a first portion first end and an opposing first portion second end, wherein said first portion is tapered between said first portion first end and said first portion second end; and
    a second portion coupled to said first portion and including a second portion first end and an opposing second portion second end, wherein said second portion defines a constant thickness between said second portion first end and said second portion second end.

2. The backsheet in accordance with claim 1, further comprising a third portion coupled to said second portion and including a third portion first end and an opposing third portion second end, said third portion is tapered between said third portion first end and said third portion second end.

3. The backsheet in accordance with claim 2, wherein said second portion is coupled between said first portion and said third portion.

4. The backsheet in accordance with claim 2, wherein said first portion second end, said third portion first end, and said second portion define substantially similar thicknesses.

5. The backsheet in accordance with claim 2, wherein said first portion first end and said third portion second end define substantially similar thicknesses.

6. The backsheet in accordance with claim 1, wherein said first portion first end defines a first thickness and said first portion second end defines a second thickness larger than the first thickness, and wherein said first portion second end is coupled to said second portion.

7. The backsheet in accordance with claim 1, wherein said first portion and said second portion are manufactured from a plurality of plies of a composite material.

8. A containment assembly for use in a turbine engine, said containment assembly comprising:
    an engine case including:
        a shell; and
        an angel wing member extending obliquely from said shell;
    a honeycomb structure coupled to said shell; and
    a backsheet coupled to said honeycomb structure and to said angel wing member, wherein said backsheet includes:
        a first portion including a first portion first end and an opposing first portion second end, wherein said first portion is tapered between said first portion first end and said first portion second end; and
        a second portion coupled to said first portion and including a second portion first end and an opposing second portion second end, wherein said second portion defines a constant thickness between said second portion first end and said second portion second end.

9. The containment assembly in accordance with claim 8, wherein said first portion extends across said angel wing member and said second portion extends across said angel wing member and said honeycomb structure.

10. The containment assembly in accordance with claim 8, wherein a gap is defined between a distal end of said angel wing member and said honeycomb structure, wherein said second portion spans said gap.

11. The containment assembly in accordance with claim 10, wherein said second portion includes an angled joint proximate said gap.

12. The containment assembly in accordance with claim 8, further comprising a third portion coupled to said second portion and extending across said honeycomb structure.

13. The containment assembly in accordance with claim 12, wherein said third portion includes a third portion first end and an opposing third portion second end, wherein said third portion is tapered between said third portion first end and said third portion second end.

14. The containment assembly in accordance with claim 8, further comprising a layer of containment material extending over said backsheet.

15. A method of forming a backsheet for use in a turbine engine containment assembly, said method comprising:
    forming a first portion of the backsheet including a first portion first end and an opposing first portion second end such that the first portion is tapered between the first portion first end and the first portion second end; and
    integrally forming a second portion with the first portion, wherein integrally forming the second portion includes forming a second portion first end and an opposing second portion second end such that the second portion defines a constant thickness between the second portion first end and the second portion second end.

16. The method in accordance with claim 15, further comprising integrally forming a third portion with the second portion, wherein integrally forming the third portion includes forming a third portion first end and an opposing third portion second end such that the third portion is tapered between the third portion first end and the third portion second end.

17. The method in accordance with claim 16, wherein integrally forming the third portion includes integrally forming the third portion first end, the first portion second end, and the second portion to define substantially similar thicknesses.

18. The method in accordance with claim 15, wherein forming the first portion and integrally forming the second portion includes forming the first portion and integrally forming the second portion from a plurality of plies of a composite material.

19. The method in accordance with claim 15, wherein forming the first portion includes forming the first portion second end with a thickness defined within a range between about 0.10 inches and about 0.25 inches.

20. The method in accordance with claim 15, wherein forming the first portion includes forming the first portion first end with a thickness defined within a range between about 0.04 inches and about 0.15 inches.

21. A backsheet for use in a turbine engine fan case, said backsheet comprising:
   a first end;
   an opposing second end; and
   a body portion extending between said first end and said second end, wherein said body portion includes a non-uniform thickness profile.

22. The backsheet in accordance with claim 21, wherein said body portion defines an annular structure.

23. The backsheet in accordance with claim 21, wherein said body portion comprises:
   a first end portion proximate said first end;
   a second end portion proximate said second end; and
   a central portion positioned between said first end portion and said second end portion, wherein at least one of said first end portion and said second end portion includes a non-uniform thickness profile.

24. The backsheet in accordance with claim 23, wherein each of said first end portion and said second end portion include a non-uniform thickness profile, and wherein said central portion includes a uniform thickness profile.

\* \* \* \* \*